United States Patent
Hunsaker

(10) Patent No.: US 11,052,794 B2
(45) Date of Patent: Jul. 6, 2021

(54) COMBINATION ADULT/CHILD SEAT

(71) Applicant: Teddy Hunsaker, Andersonville, TN (US)

(72) Inventor: Teddy Hunsaker, Andersonville, TN (US)

( * ) Notice: Subject to any disclaimer, the term of this patent is extended or adjusted under 35 U.S.C. 154(b) by 0 days.

(21) Appl. No.: 16/602,571

(22) Filed: Nov. 1, 2019

(65) Prior Publication Data

US 2021/0129718 A1    May 6, 2021

(51) Int. Cl.
| | |
|---|---|
| *A47C 7/46* | (2006.01) |
| *B60N 2/32* | (2006.01) |
| *B60N 2/90* | (2018.01) |
| *B60N 2/26* | (2006.01) |

(52) U.S. Cl.
CPC ............... *B60N 2/32* (2013.01); *B60N 2/26* (2013.01); *B60N 2/914* (2018.02); *B60N 2/99* (2018.02)

(58) Field of Classification Search
CPC . B60R 21/207; B60R 21/18; B60R 21/23138; B60N 2/914; B60N 2/986; B60N 2/665; B60N 2/99; Y10S 297/03; Y10S 297/08
See application file for complete search history.

(56) References Cited

U.S. PATENT DOCUMENTS

| | | | |
|---|---|---|---|
| 4,592,588 A | 6/1986 | Isono et al. | |
| 4,607,887 A * | 8/1986 | Vail | A47C 7/18 297/452.26 |
| 4,756,574 A | 7/1988 | Andres et al. | |
| 4,775,185 A | 10/1988 | Scholin et al. | |
| 4,965,899 A | 10/1990 | Sekido et al. | |
| 5,127,708 A | 7/1992 | Kishi et al. | |
| 5,129,704 A | 7/1992 | Kishi et al. | |
| 5,263,765 A | 11/1993 | Nagashima et al. | |
| 5,320,409 A | 6/1994 | Katoh et al. | |
| 5,893,609 A | 5/1999 | Schmidt | |
| 6,659,553 B2 | 12/2003 | Achleitner et al. | |
| 6,912,748 B2 * | 7/2005 | VanSickle | A47C 4/54 5/654 |
| 7,726,739 B2 * | 6/2010 | Wain | B60N 2/68 297/284.9 |
| 7,963,553 B2 * | 6/2011 | Huynh | B60N 2/986 280/730.2 |
| 8,474,862 B2 * | 7/2013 | Pursche | B60R 21/268 280/730.2 |
| 8,602,449 B2 * | 12/2013 | Kojima | B60N 2/986 280/730.2 |

(Continued)

*Primary Examiner* — Shin H Kim
(74) *Attorney, Agent, or Firm* — Michael E. McKee

(57) ABSTRACT

A seat having a seating region including a seat portion and a backing region including a back portion utilizes pairs of wing portions which are hingedly connected to the seat portion and to the back portion adjacent the sides thereof. In addition, each of the wing portions includes a distensible envelope which can be altered in shape between a deflated condition at which the wing portion contributes to the overall width of the seating region or of the backing region and an inflated condition at which the wing portion provides a partition adjacent the corresponding side of the seat portion or of the back portion so that when the distensible envelopes of all of the wing portions are in the inflated condition, the partitions provided by the wing portions reduce the size of the seating and backing regions of the seat.

15 Claims, 4 Drawing Sheets

(56) References Cited

U.S. PATENT DOCUMENTS

| | | | | |
|---|---|---|---|---|
| 8,602,478 B2* | 12/2013 | Voelz | ............... | B60N 2/99 296/63 |
| 8,844,966 B2* | 9/2014 | Feller | ............... | B60N 2/99 280/730.2 |
| 9,045,063 B2* | 6/2015 | Line | ............... | B60N 2/99 |
| 9,102,252 B2* | 8/2015 | Sugiyama | ............... | B60N 2/99 |
| 9,393,891 B2* | 7/2016 | Beier | ............... | B60N 2/7017 |
| 9,409,504 B2* | 8/2016 | Line | ............... | B60N 2/64 |
| 9,809,131 B2* | 11/2017 | Line | ............... | B60N 2/0232 |
| 9,896,007 B2* | 2/2018 | Ohno | ............... | B60N 2/885 |
| 2007/0057551 A1* | 3/2007 | Lachenmann | ............... | B60N 2/99 297/284.9 |
| 2008/0191532 A1* | 8/2008 | Wain | ............... | B60N 2/68 297/284.1 |
| 2010/0090448 A1* | 4/2010 | Pursche | ............... | B60R 21/268 280/730.2 |
| 2010/0283229 A1* | 11/2010 | Feller | ............... | B60R 21/207 280/728.2 |

* cited by examiner

COMBINATION ADULT/CHILD SEAT

BACKGROUND OF THE INVENTION

This invention relates generally to a seat within which an individual can be seated and relates, more particularly, to such a seat which incorporates an inflatable air bladder for altering a characteristic of the seat and which is well-suited for use in a vehicle.

The class of seats with which this invention is to be compared includes those having a bottom, or seat, portion and/or a back portion against which the back of an individual can rest as he remains seated upon the seat portion. In addition, the seat incorporates at least one air-inflatable bladder capable of altering the shape of a portion of the seat.

It would be desirable to provide a new and improved seat which employs air bladders for altering characteristics of the seat so that the seat can be adjusted between one condition at which an adult-sized individual can be seated comfortably within the seat and another condition at which a child-sized individual can be seated comfortably within the seat.

Accordingly, it is an object of the present invention to provide a new and improved seat which employs air bladders which can be inflated or deflated for purposes of adjustment of the size of the seat.

Another object of the present invention is to provide such a seat whose size can be adjusted between one condition at which an adult-sized individual can comfortably sit within the seat and another condition at which a child-sized individual can comfortably sit within the seat.

Still another object of the present invention is to provide such a seat whose size can be readily adjusted between the one condition and the another condition.

Yet another object of the present invention is to provide such a seat whose seating region has a width which is adjustable by way of its air bladders.

A further object of the present invention is to provide such a seat having a backing region having a width which is adjustable by way of its air bladders.

A still further object of the present invention is to provide a seat having an improved control arrangement by which the inflation or deflation of the air bladders is controlled.

A yet further object of the present invention is to provide such a seat which is uncomplicated in structure, yet effective in operation.

One more object of the present invention is to provide such a seat whose features can be embodied in a child booster seat and thus act as a substitute for commonly-used child booster seat.

SUMMARY OF THE INVENTION

This invention resides in a seat having a seating region including a seat portion having two opposite sides.

The seat includes a pair of side wing portions wherein each side wing portion is connected to the seat portion adjacent a corresponding one of the two opposite sides of the seat portion of the seat. In addition, each of the side wing portions includes a distensible envelope, or bladder, which can be altered in shape between a deflated condition at which the side wing portion contributes to the overall width of the seating region of the seat and an inflated condition at which the side wing portion provides a partition adjacent the corresponding side of the two opposite sides of the seat portion of the seat so that when the distensible envelopes of both side wing portions are in the inflated condition, the partitions provided by the side wing portions reduce the size of the seating region of the seat.

In a particular embodiment of the invention, the seat includes a backing region including a back portion having two opposite sides, and the seat includes a pair of back wing portions wherein each back wing portion is connected to the back portion adjacent a corresponding one of the two opposite sides of the back portion of the seat. In addition, each of the back wing portions includes a distensible envelope, or bladder, which can be altered in shape between a deflated condition at which the back wing portion contributes to the overall width of the backing region of the seat and an inflated condition at which the back wing portion provides a partition adjacent the corresponding side of the two opposite sides of the back portion of the seat so that when the distensible envelopes of both back wing portions are in the inflated condition, the partitions provided by the back wing portions reduce the size of the backing region of the seat.

DETAILED DESCRIPTION OF AN ILLUSTRATIVE EMBODIMENT

Figure 1:
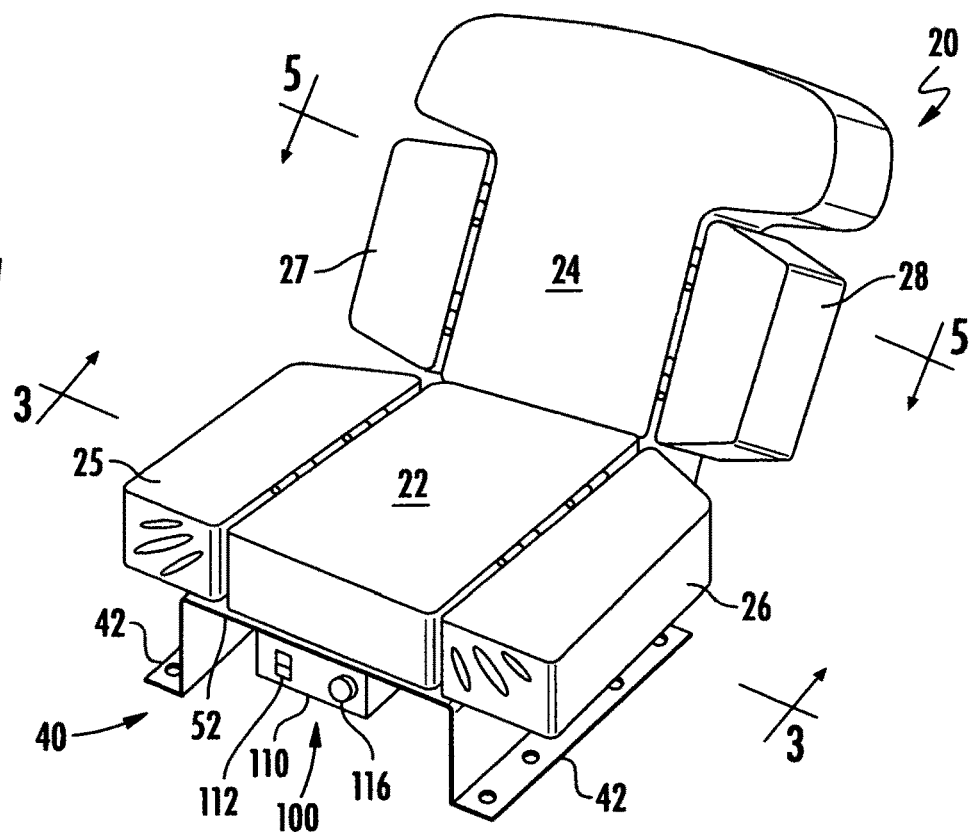
FIG. 1 is a perspective view of a combination adult/child vehicle seat within which features of the present invention are embodied and depicting the seat when in a condition for occupancy by an adult.
Figure 2:
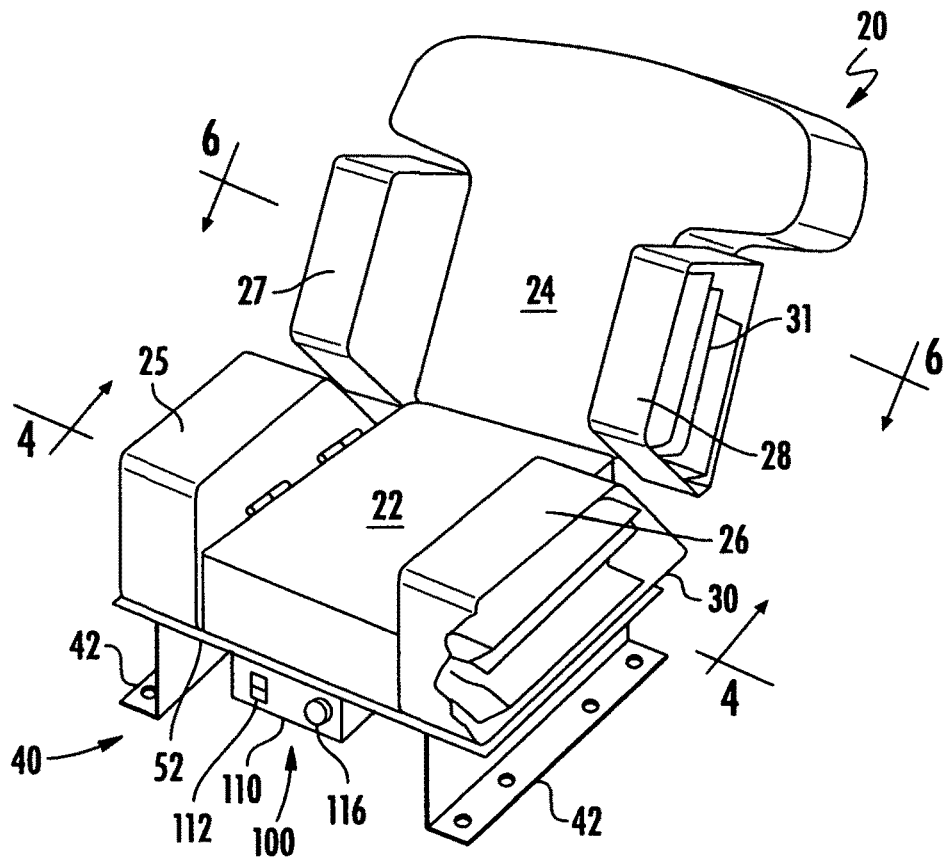
FIG. 2 is a perspective view of the FIG. 1 vehicle seat like that of FIG. 1 but depicting the seat when in a condition for occupancy by a child and shown partially cut-away.

Turning now to the drawings in greater detail and considering first FIGS. 1 and 2, there is illustrated an embodiment, generally indicated 20, of a vehicle seat within which features of the present invention are incorporated. The seat 20 includes a seat portion 22 upon which an occupant can be seated and a back portion 24 against which the back of the occupant can rest when the occupant is seated upon the seat portion 22. The seat 20 also includes two pairs of wing portions 25, 26 and 27, 28 wherein each wing portion is joined to a corresponding one of the seat portion 22 and the back portion 24 and on opposite sides thereof for hinged, or pivotal, movement with respect thereto. In addition, the each wing portion 25, 26, 27 or 28 includes an air bladder, or distensible envelope 30 or 31 (FIG. 2), which, when selectively inflated or deflated, alters the shape and position of the wing portion 25, 26, 27 or 28 in relation to the seat portion 22 or back portion 24 so that the width of the seating region of the seat 20 or the width of the backing region of the seat 20 is altered accordingly.

Although the seat 20 is being described herein as a seat for a vehicle (e.g. an automobile), the features described herein can be incorporated within a seat which is suitable for an alternative use, such as a child-accepting booster seat. Accordingly, the features of the present invention can be variously applied.

Figure 3:
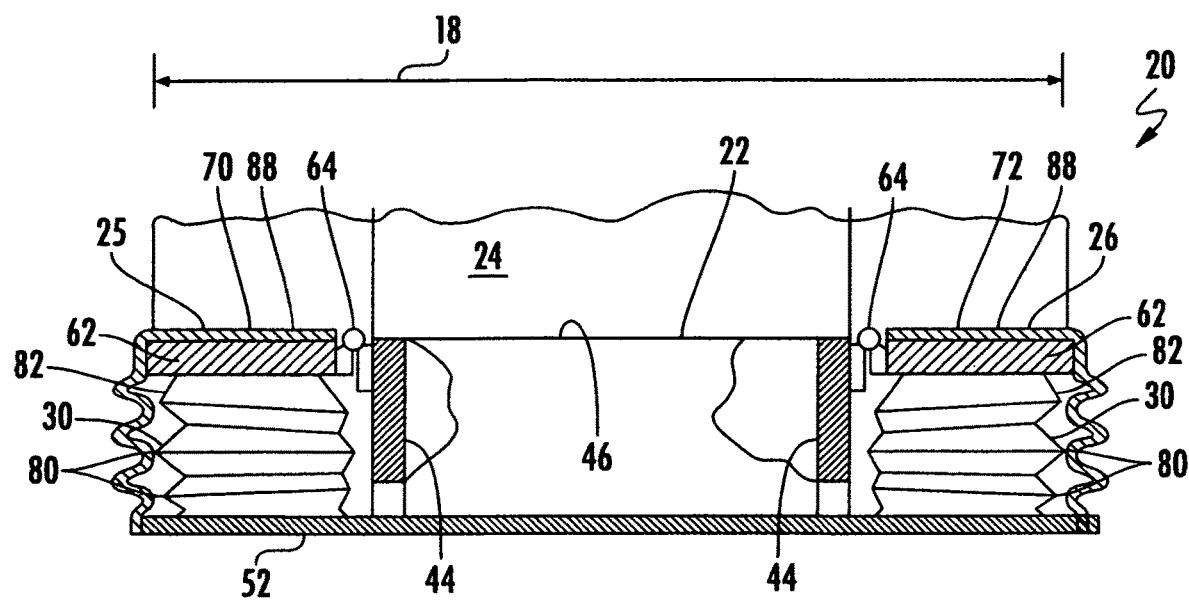
FIG. 3 is a cross-sectional view of the seat portion and seat wing portions of the FIG. 1 seat taken about along line 3-3 of FIG. 1.
Figure 4:
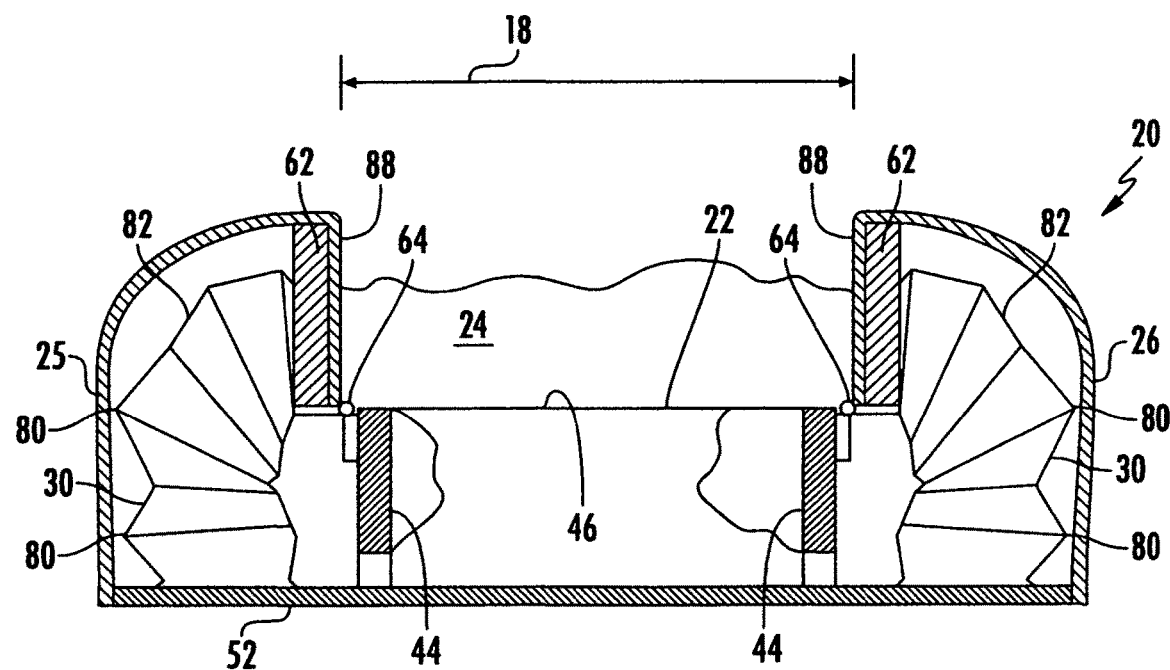
FIG. 4 is a cross-sectional view of the seat portion and seat wing portions of the FIG. 1 seat taken about along line 4-4 of FIG. 2.

With respect to FIGS. 1-6, as long as the distensible envelopes 30 associated with the side wing portions 25, 26 are in the deflated condition as depicted in FIG. 3, the side wing portions 25, 26 contribute to the overall width of the seating region, indicated 18 in FIG. 3, to accommodate (the width of) an adult occupant seated thereon. In contrast and when the distensible envelopes 30 associated with the side wing portions 25, 26 are in a fully-inflated condition as depicted in FIGS. 2 and 4, the side wing portions 25, 26 lessen, or reduce, the overall width of the seating region 18 (to the narrower width depicted in FIG. 4) so that the width thereof will accommodate only (the width of) a child occupant seated thereon.

Figure 5:
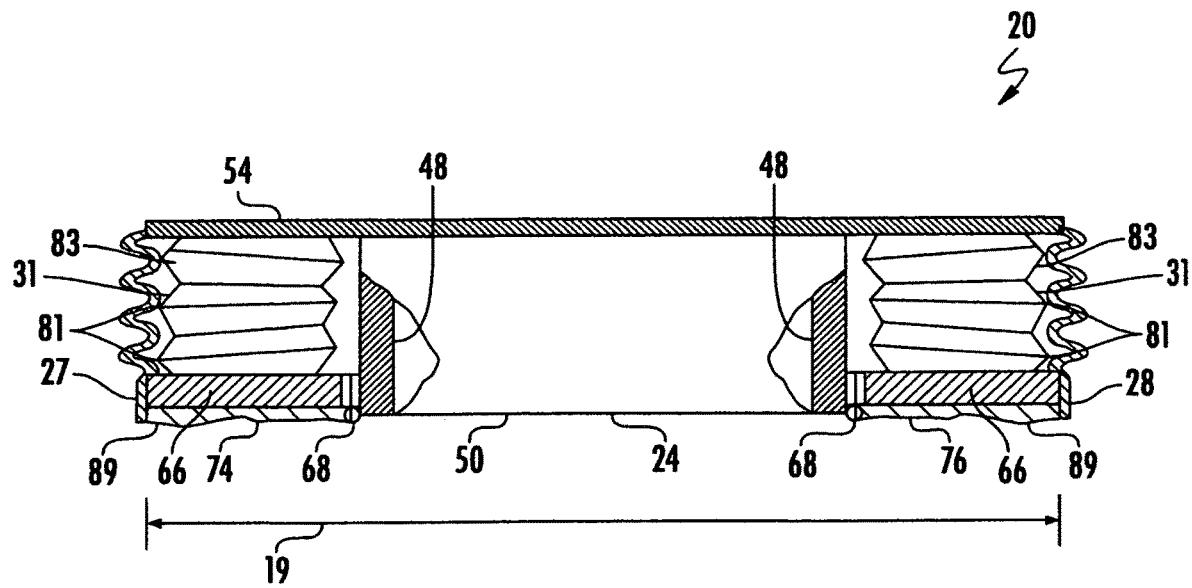
FIG. 5 is a cross-sectional view of the back portion and back wing portions of the FIG. 1 seat taken about along line 5-5 of FIG. 1.
Figure 6:
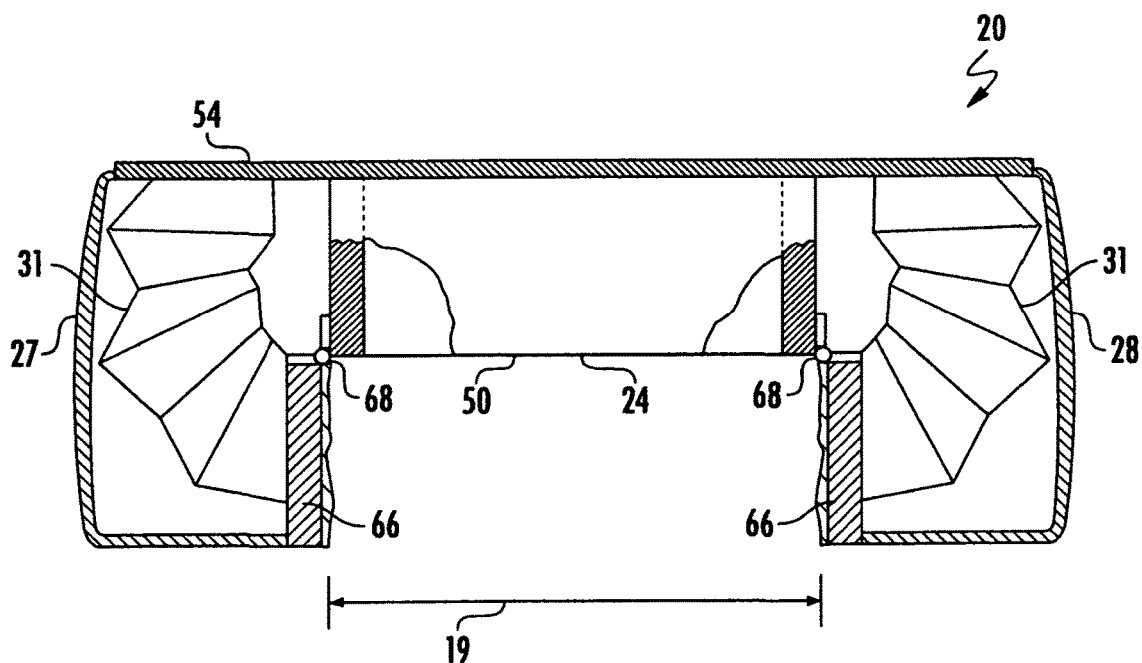
FIG. 6 is a cross-sectional view of the back portion and back wing portions of the FIG. 1 seat taken about along line 6-6 of FIG. 2.

By comparison and as long as the distensible envelopes 31 associated with the back wing portions 27, 28 are in the deflated condition as depicted in FIG. 5, the back wing portions 27, 28 contribute to the overall width of the backing region, indicated 19 in FIG. 5, to accommodate (the width of) an adult occupant whose back rests thereagainst. In contrast and when the distensible envelopes 31 associated with the back wing portions 27, 28 are in a fully-inflated condition as depicted in FIGS. 2 and 6, the back wing portions 27, 28 lessen, or reduce, the overall width of the backing region 19 (to the narrower width as depicted in FIG. 6) so that the width thereof will accommodate only (the width of) a child occupant whose back rests thereagainst.

In connection with the foregoing, the seat 20 includes a frame, generally indicated 40 in FIGS. 1 and 2, upon which the seating portion 22 and the back portion 24 of the seat 20 are supported in somewhat of an L-shaped configuration (when the seat 20 is viewed from a side thereof), and the frame 40 includes flanges 42 adjacent the bottom thereof within which the seat 20 can be secured (as with bolts) in place within the floorboard of a vehicle (not shown). In addition and as best shown in FIGS. 3 and 4, the seat portion 22 includes two side members 44 which are positioned adjacent the two opposite sides thereof, and it is upon these two side members 44 that (seat) cushioning material 46 of the seat 20 is supported. Similarly and as best shown in FIGS. 5 and 6, the back portion 24 includes two side members 48 which are positioned adjacent the two opposite sides thereof, and it is against these two side members 48 that (back) cushioning material 50 is supported. If desired, the outer surface of the cushioning material 46 and 50 can be provided by a suitable sheet material comprised, for example, of woven fabric, leather or plastic.

In addition, the frame 40 includes a base sheet 52 (FIGS. 3 and 4) upon which the seating portion 22 is positioned and a backing sheet 54 (FIGS. 5 and 6) against which the back portion 24 is positioned. As will be apparent herein, it is the base sheet 52 against which the distensible envelopes 30 of the side wing portions 25, 26 are adapted to act when the distensible envelopes 30 are inflated, and it is the backing sheet 54 against which the distensible envelopes 31 of the back wing portions 27, 28 are adapted to act when the distensible envelopes 31 are inflated.

With reference to FIGS. 3 and 4, each side wing portion 25 or 26 includes a platen member 62 which is pivotally joined, as with a hinge 64 (e.g. a piano-type hinge), to a corresponding side member 44 of the seat portion 22 so that each platen member 62 can be pivotally moved with respect to the seat portion 22 between a substantially horizontal orientation as best shown in FIG. 3 and a substantially vertical orientation as best shown in FIG. 4, at which the platen member 62 is disposed at a substantially right angle with respect to the base sheet 52 of the frame 40. When each platen member 62 is oriented in its FIG. 3 substantially horizontal orientation, the platen member 62 (and any cushioning material secured thereon) contributes to the width of a seating region 18 of the seat 20 as discussed earlier. In contrast, when the platen members 62 are in the FIG. 4 substantially vertical condition, the plate members 62 provide partitions which border the sides of the seat portion 22 so that the width of the seating region 18 of the seat 20 is limited, or reduced, to the width of the seating portion 22.

By comparison and with reference to FIGS. 5 and 6, each back wing portion 27 or 28 includes a platen member 66 which is pivotally joined, as with a hinge 68 (e.g. a piano-type hinge), to a corresponding side member 46 of the back portion 24 so that each platen member 66 can be pivotally moved with respect to the back portion 24 between a forwardly-facing orientation, as best shown in FIG. 5, at which the plate member 66 is arranged substantially parallel to the backing sheet 54 of the frame 40 and an alternative, or partition-providing, orientation at which the platen member 66 is disposed at a substantially right angle with respect to the backing sheet 54 of the frame 40.

When the platen members 66 are oriented in the FIG. 5 forwardly-facing orientation, the platen member 66 (and any cushioning material secured thereto) contributes to the width of the backing region 19 of the seat 20 as discussed earlier. In contrast, when the platen members 66 are positioned in the FIG. 6 normal relationship with the backing sheet 54, the platen members 66 provide partitions which border the sides of the back portion 24 so that the backing region 19 of the seat 20 is limited, or reduced, to the width of the backing portion 24.

It is a feature of the present invention that the distensible envelopes 30, 31 of the side wing portions 25, 26 and the back wing portions 27, 28 are positioned between a corresponding pair of the base sheet 52 and a platen member 62 or of the backing sheet 54 and a platen member 66 so that as long as the distensible envelopes 30, 31 are in the uninflated, or deflated, condition, the platen members 62, 66 remain in the orientations depicted in FIGS. 3 and 5 at which the platen members 62, 66 are arranged substantially parallel to the corresponding base sheet 52 or backing sheet 54, and when the distensible envelopes 30, 31 are in the inflated (i.e. a fully-inflated) condition, the platen members 62, 66 are shifted in position (i.e. pivotally moved about the hinges 64, 68) to the orientations depicted in FIGS. 4 and 6 at which the platen members 62, 66 are arranged substantially normal to the corresponding base or backing sheet 52 or 54.

It follows from the foregoing that when the distensible envelopes 30 of the side wing portions 25, 26 are in the deflated condition as depicted in FIG. 3, the platen members 62 of the side wing portions 26, 28 provide upwardly-facing regions 70, 72 which contribute to, and thereby widen, the width of the usable seating region 18 of the seat 20, and when the distensible envelopes 30 are in the inflated condition as depicted in FIG. 4, the platen members 62 of the side wing portions 26, 28 provide upstanding side partitions which confine the width of the usable seating region 18 of the seat 20 to that of the seat portion 22. Similarly, when the distensible envelopes 31 of the back wing portions 27, 28 are in the deflated condition as depicted in FIG. 5, the platen members 66 of the back wing portions 27, 28 provide forwardly-facing regions 74, 76 which face forwardly of the back portion 24 and which contribute to, and thereby widen, the width of the usable backing region 19 of the seat 20, and when the distensible envelopes 31 of the back wing portions 27, 28 are in the inflated condition as depicted in FIG. 6, the platen members 66 of the back wing portions 27, 28 provide upstanding side partitions which face one another and which confine the width of the usable backing region 19 of the seat 20 to that of the back portion 24.

With reference again to FIGS. 3 and 4, the distensible envelope 30 of each side wing portion 26 or 27 is in the form of a bellows-type bladder which can be altered in shape between a collapsed, relatively flat condition, as depicted in FIG. 3, and an inflated (i.e. a fully-inflated) condition as depicted in FIG. 4. To this end, each envelope 30 is provided with a plurality of pleats 80 which extend about the perimeter of the envelope 30 and which enable the outwardmost side, indicated 82, of the envelope 30 to expand in thickness (when inflated) at a faster rate than the opposite, inwardmost side of the envelope 30. This being the case, the pleats 80 facilitate the movement of the platen members 62, when acted upon by the envelope 30 during an envelope-inflation process, to be altered in position between a substantially horizontal orientation, as depicted in FIG. 3 to a substantially vertical orientation, as depicted in FIG. 4.

If desired, the outer surfaces of the platen members 62 of the envelope 30 can be wrapped, or covered, with relatively soft fabric or other cushioning material to provide the side wing portions 26 and 27 with a relatively soft outer layer 88.

By comparison and with reference again to FIGS. 5 and 6, the distensible envelope 31 of each back wing portion 27 or 28 is in the form of a bellows-type bladder which can be altered in shape between a collapsed, relatively flat condition, as depicted in FIG. 5, and an inflated (i.e. a fully-inflated) condition as depicted in FIG. 6. To this end, the envelope 31 is provided with a plurality of pleats 81 which extend about the perimeter of the envelope 31 and which enables the outermost side, indicated 83, to expand in thickness (when inflated) at a faster rate than the opposite, inwardmost side of the envelope 31. This being the case, the pleats 81 facilitate the movement of the platen members 66, when acted upon by the envelope 31 during an envelope-inflations process, to be altered in position between a forwardly-facing orientation, as depicted in FIG. 5, to a substantially vertical orientation, as depicted in FIG. 6.

If desired, the outer surfaces of the platen members 66 and the envelope 31 can be wrapped, or covered, with relatively soft fabric or other cushioning material to provide the back wing portions 27 and 28 with a relatively soft outer layer 89.

Figure 7:
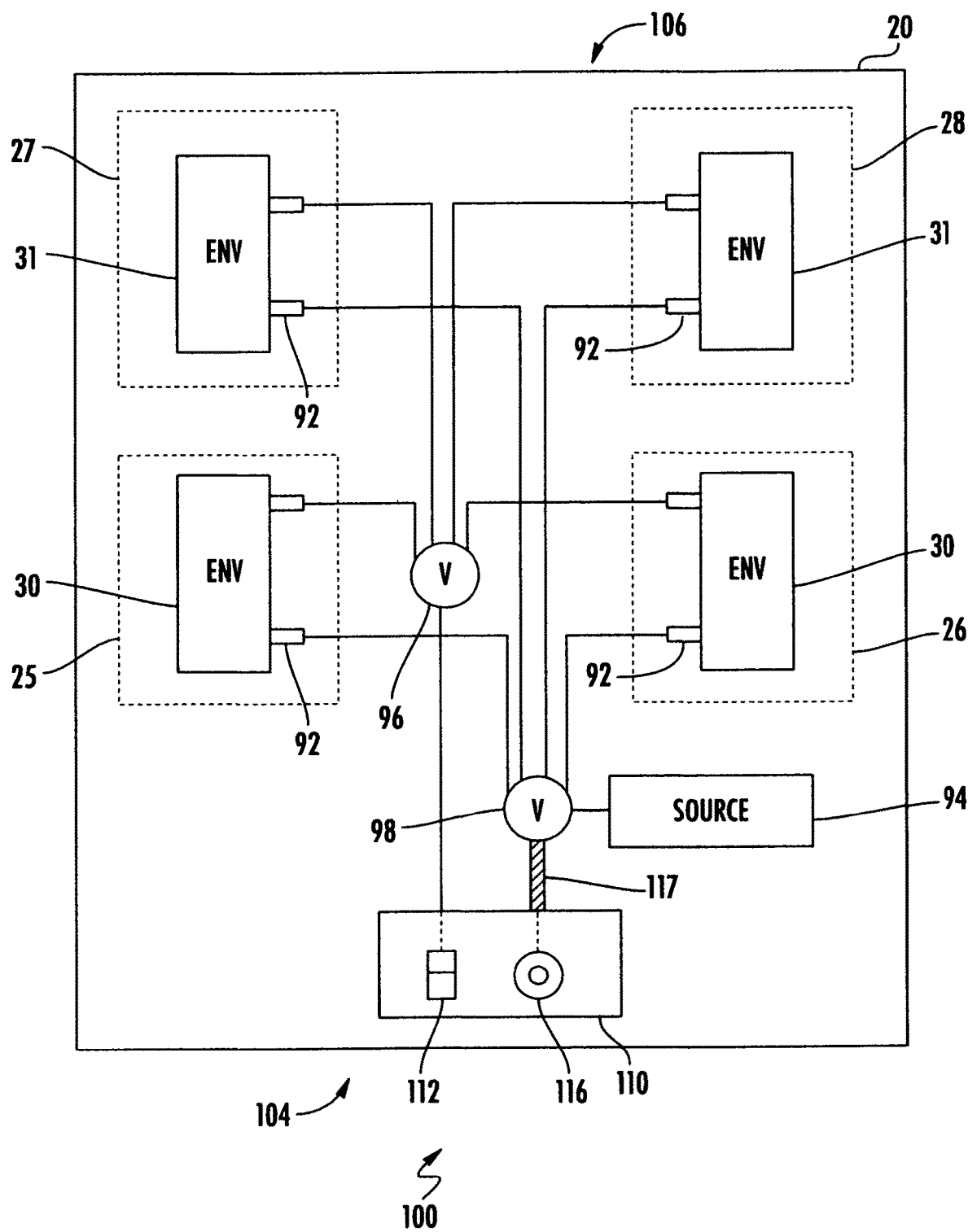
FIG. 7 is a diagram illustrating schematically an exemplary control scheme with which the distensible envelopes of the seat wing portions and of the back wing portions can be selectively altered between inflated and deflated conditions.

With reference to FIG. 7, the seat 20 includes means, generally indicated 100, for controlling the condition of the distensible envelopes 30, 31 between the deflated and inflated conditions. To this end, the controlling means 100 includes a tank, or source 94, of compressed gas which is supported by the frame 40 beneath the seat portion 22. Within the depicted seat 20, the source 94 is provided by a tank of compressed air. In addition, the controlling means 100 also includes an arrangement of valve controls, generally indicated 104, by which an individual can control the deflated/inflated condition of the envelopes 30, 31. A network of conduits, indicated generally 106 in FIG. 7, are connected between the source 94 of compressed air and the distensible envelopes 30, 31, and suitable valving, described herein, is mounted within the conduits 106 and is controllable by way of the valve controls 104 for selectively altering the condition of the distensible envelopes 30, 31 between the inflated and deflated conditions.

Each envelope 30 or 31 also includes an inlet stem 92 (FIG. 7) through which compressed air from the source 94 is conducted to the interior of the envelope 30 or 31, and there is associated with each envelope 30 or 31 an outlet valve 96 through which, when desired, compressed air is permitted to exit, or escape, the interiors of the envelopes 30, 31. As will be apparent herein, when it is desired to inflate the envelope 30, a valve 98 associated with the compressed air source 94 is opened to permit a flow of compressed air into the interiors of the envelopes 30, 31 by way of the inlet stems 92. When the envelopes 30, 31 have been inflated to a desired amount (i.e. so that each side or back wing portion 25, 26, 27 or 28 assumes its partition-providing condition of FIG. 4 or 6), the valve 98 is closed. Conversely and when the side and back wing portions 25, 26, 27, 28 are subsequently desired to be deflated (to, for example, return the seat 20 to its FIG. 1 condition for accommodating an adult seated therein), the outlet valve 96 is opened so that the compressed air contained within the envelopes 30, 31 can escape and thus permit the envelopes 30, 31 to return to the deflated conditions of FIG. 3 or 5.

When the distensible envelopes 30, 31 are in the deflated conditions depicted in FIGS. 1, 3 and 5 (at which the platen members 62 and 66 are substantially co-extensive with, respectively, the upwardly-facing surface of the seat portion 22 or the forwardly-facing surface of the back portion 24 and at which the seating and backing regions 18, 19 are at their widest (and thus well-suited to accommodate an adult seated with the seat 20) and it is desired to alter the shape of the seat 20 so that its seating and backing regions 18, 19 are significantly reduced in width and thus better-suited for accommodating a child seated within the seat 20, the valve 98 associated with the source 94 of compressed air is opened so that the interiors of the distensible envelopes 30, 31 begin to fill with air delivered thereto through the inlet stems 92 thereof. It is be understood that as the envelopes 30, 31 are being inflated, the outlet valve 96 associated with the distensible envelopes 30, 31 is closed.

As the distensible envelopes 30 are inflated by the air, under pressure, delivered thereto from the source 94 by way of the valve 98, the envelopes 30 act between the base sheet 52 and the platen members 62 so that the platen members 62 of the side wing portions 25, 26 are pivoted relative to the seat portion 22 and about the hinges 64 from the upwardly-facing conditions of FIGS. 1 and 3 toward the substantially vertical, or upright, partition-providing condition as depicted in FIGS. 2 and 4 at which the platen members 62 oppose, or face, one another. Similarly, as the distensible envelopes 31 are inflated by the air, under pressure, delivered thereto from the source 94 by way of the valve 98, the envelopes 31 act between the backing sheet 54 and the platen members 66 so that the platen members 66 of the back wing portions 27, 28 are pivoted relative to the back portion 24 and about the hinges 68 from the forwardly-facing condition of FIGS. 1 and 5 toward the substantially upright, partition-providing conditions as depicted FIGS. 2 and 6. Upon reaching the substantially vertical, or upright, condition of FIGS. 3 and 5, the valve 98 leading from the pressurized air source 94 is closed.

Preferably, the interiors of the distensible envelopes 30, 31 possess comparable capacities for holding pressurized air so that the distensible envelopes 30, 31 achieve a fully-inflated condition at about the same time. That being the case, only the valve 98 needs to be closed to discontinue any further flow of pressurized air into the envelopes 30, 31.

It follows that when the distensible envelopes 30, 31 are in the inflated condition, the platen members 62 and 66 provide opposing pairs of partitions which reduce the width of the seating region 18 and the backing region 19, respectively. Accordingly, when the seat 20 assumes the condition depicted in FIG. 2 at which all of the envelopes 30, 31 are inflated, the seat 20 is well-suited for accommodating a child seated therein.

When it is desired to alter the shape of the seat 20 from its envelope-inflated condition of FIG. 2 so that its seating and backing region 18, 19 revert to the conditions depicted in FIGS. 3 and 5 at which the seating and backing regions 18, 19 are increased in width (from the conditions depicted in FIGS. 4 and 6), the outlet valve 96 associated with the distensible envelopes 30, 31 is opened so that air contained within the envelopes 30, 31 is permitted to escape from the interiors thereof. As the air is permitted to escape from the distensible envelopes 30, 31, the envelopes 30, 31 collapse so that, in turn, the side wing portions 25, 26 hingedly move relative to the seat portion 22 from the partition-providing conditions depicted in FIG. 4 toward the upwardly-facing conditions depicted in FIG. 3 and the platen members 66 of the back wing portions 27, 28 hingedly move relative to the back portion 24 from the partition-providing conditions depicted in FIG. 6 toward the forwardly-facing conditions depicted in FIG. 5. If desired, manual pressure can be applied to the distensible envelopes 30, 31 so that the envelopes 30, 31 are squeezed in a manner which hastens the escape of air from the interior of the envelopes 30, 31.

When the envelope 30, 31 are deflated to such an extent that the platen members 62 of the side wing portions 25, 26 assume the substantially upwardly-facing conditions as depicted in FIGS. 1 and 3 and the platen members 66 of the back wing portions 27, 28 assume the substantially forwardly-facing conditions as depicted in FIGS. 1 and 5, the outlet valve 96 is closed.

As mentioned earlier, the opening and closing of the aforedescribed valve 98 associated with the compressed air source 94 and the outlet valve 96 can be effected by way of the arrangement of valve controls 104 mounted upon a control panel 110. Within the depicted seat 20, the control panel 110 is supported by the frame 40 of the seat 20 and disposed generally beneath the seat portion 22 so as to be accessible at the front of the seat 20. In this connection and with reference to FIG. 7, there are mounted within the control panel 110 a two-position switch 112 and a rotatable knob 116. The knob 116 is operatively connected (e.g. by way of a cable 117) to the valve 98 associated with the pressurized air source 94 so that rotation of the knob 116 in one rotational direction opens the valve 98 and rotation of the knob 116 in the opposite rotational direction closes the valve 98. Meanwhile, the switch 112 is operatively connected to the outlet valve 96 so that when the switch 112 is positioned in a first of its two positions, the valve 98 is closed, and when the switch 112 is positioned in the second of its two positions, the valve 98 is opened.

It follows from the foregoing that a seat 20 has been described wherein the seat has a seating region 18 including a seat portion 22 having two opposite sides and has a backing region 19 including a back portion 24 having two opposite sides. The seat 20 includes a pair of side wing portions 25, 26 wherein each side wing portion 25 or 26 is connected to the seat portion 22 adjacent a corresponding one of the two opposite sides of the seat portion 22 of the seat 20 and wherein each of the side wing portions 25 or 26 includes a distensible envelope 30 which can be altered in shape between a deflated condition at which the side wing portion 25 or 26 contributes to the overall width of the seating region 18 of the seat 20 and an inflated condition at which the side wing portion 25 or 26 provides a partition adjacent the corresponding side of the two opposite sides of the seat portion 22 of the seat 20 so that when the distensible envelopes 30 of both side wing portions 25, 26 are in the inflated condition, the partitions provided by the side wing portions 25, 26 reduce the size of the seating region 18 of the seat 20.

In addition, the seat 20 includes a pair of back wing portions 27, 28 wherein each back wing portion 27 or 28 is connected to the back portion 24 adjacent a corresponding one of the two opposite sides of the back portion 24 of the seat 20 and wherein each back wing portion 27 or 28 includes a distensible envelope 31 which can be altered in shape between a deflated condition at which the back wing portion 27 or 28 contributes to the overall width of the backing region 19 of the back portion 24 of the seat 20 and an inflated condition at which the back wing portion 27 or 28 provides a partition adjacent the corresponding side of the two opposite sides of the back portion 24 of the seat 20 so that when the distensible envelopes 31 of both back wing portions 27, 28 are in the inflated condition, the partitions provided by the back wing portions 27, 28 reduce the size of the backing region 19 of the seat 20. In addition, the seat 20 includes means, such as the compressed air tank, or source 94, for selectively altering the condition of the distensible envelopes 30, 31 of the side wing portions 25, 26 and the back wing portions 27, 28 between the inflated and deflated conditions.

It will be understood that numerous modifications and substitutions can be had to the aforedescribed embodiment 20 without departing from the spirit of the invention. For example, although the aforedescribed embodiment 20 has been shown and described as including a pair of side wing portions 25, 26 and a pair of back wing portions 27, 28, a seat in accordance with the broader principles of the present invention could include only one of the pairs of side wing portions 25, 26 and back wing portions 27, 28. Accordingly, the aforedescribed embodiment 20 is intended for the purpose of illustration and not as limitation.

The invention claimed is:

1. A seat having a seating region including a seat portion having two opposite sides, the seat comprising:

a pair of side wing portions wherein each side wing portion is connected to the seat portion adjacent a corresponding one of the two opposite sides of the seat portion of the seat and wherein each of the side wing portions includes a distensible envelope which can be altered in shape between a deflated condition at which the side wing portion contributes to the overall width of the seating region of the seat and an inflated condition at which the side wing portion reduces the overall width of the seating region of the seat and provides a partition adjacent the corresponding side of the two opposite sides of the seat portion of the seat so that when the distensible envelopes of both side wing portions are in the inflated condition and the seat portion is in the condition of reduced width, the pair of partitions provided by the pair of side wing portions are arranged on opposite sides of the seating region are capable of capturing an individual seated between the pair of partitions of the side wing portions, wherein the seat portion of the seat defines a substantially upwardly-facing surface and each side wing portion includes a platen support member which, when the distensible envelope of the side wing portion is in the deflated condition, provides a substantially upwardly-facing surface disposed adjacent the substantially upwardly-facing surface of the seat portion and which, when the distensible envelope of the side wing portion is in the inflated condition, provides the aforesaid partition; and wherein the platen support member of each side wing portion is pivotally joined to the seat portion adjacent a corresponding side of the two opposite sides of the seat portion to accommodate a pivotal movement of the platen support member through at least about ninety degrees of movement between a first condition at which the platen support member provides the substantially upwardly-facing surface of the side wing portion and a second condition at which the platen support member provides the aforesaid partition.

2. The seat as defined in claim 1 wherein the seat includes a frame having a frame portion associated with the seat portion, and each platen support member is hingedly joined to the frame portion of the frame.

3. The seat as defined in claim 1 wherein the seat further has a backing region including a back portion having two opposite sides and the seat further includes a pair of back wing portions wherein each back wing portion is connected to the back portion adjacent a corresponding one of the two opposite sides of the back portion of the seat and wherein each back wing portion includes a distensible envelope which can be altered in shape between a deflated condition at which the back wing portion contributes to the overall width of the backing region of the back portion of the seat and an inflated condition at which the back wing portion provides a partition adjacent the corresponding side of the two opposite sides of the back portion of the seat so that when the distensible envelopes of both back wing portions are in the inflated condition, the partitions provided by the back wing portions reduce the overall width of the backing region of the seat.

4. The seat as defined in claim 3 further including a source of pressurized gas which is operatively connected to the distensible envelopes for inflating the distensible envelopes.

5. The seat as defined in claim 3 wherein the back portion of the seat defines a substantially forwardly-facing surface and each back wing portion includes a platen support member which, when the distensible envelope of the back wing portion is in the deflated condition, provides a substantially forwardly-facing surface disposed adjacent the substantially forwardly-facing surface of the back portion and which, when the distensible envelope of the back wing portion is in the inflated condition, provides the aforesaid partition provided by the back wing portion.

6. The seat as defined in claim 5 wherein the platen support member of each back wing portion is pivotally joined to the back portion adjacent a corresponding side of the two opposite sides of the back portion to accommodate a pivotal movement of the platen support member of the back wing portion between a first condition at which the platen support member of the back wing portion provides the substantially forwardly-facing surface of the back wing portion and a second condition at which the platen support member of the back wing portion provides the aforesaid partition provided by the back wing portion.

7. The seat as defined in claim 6 wherein the frame of the seat includes a frame portion associated with the back portion, and the platen support member of each back wing portion is hingedly joined to the frame portion of the frame associated with the back portion of the seat.

8. The seat as defined in claim 1 further including a source of pressurized gas which is operatively connected to each distensible envelope for inflating the distensible envelope of each side wing portion.

9. A seat having a backing region including a back portion having two opposite sides, the seat comprising:

a pair of back wing portions wherein each back wing portion is connected to the back portion adjacent a corresponding one of the two opposite sides of the back portion of the seat wherein each of the back wing portions includes a distensible envelope which can be altered in shape between a deflated condition at which the back wing portion contributes to the overall width of the backing region of the seat and an inflated condition at which the back wing portion reduces the overall width of the backing region and provides a partition adjacent the corresponding side of the two opposite sides of the back portion of the seat so that when the distensible envelopes of both back wing portions are in the inflated condition and the back portion is in the condition of reduced width, the pair of partitions provided by the pair of back wing portions are arranged on opposite sides of the backing region and are capable of capturing an individual arranged between the pair of partitions provided by the back wing portions;

wherein the back portion of the seat defines a substantially forwardly-facing surface and each back wing portion includes a platen support member which, when the distensible envelope of the back wing portion is in the deflated condition, provides a substantially forwardly-facing surface disposed adjacent the forwardly-facing surface of the back portion and which, when the distensible envelope of the back wing portion is in the inflated condition, provides the aforesaid partition; and wherein the platen support member of each back wing portion is pivotally joined to the back portion adjacent a corresponding side of the two opposite sides of the back portion to accommodate a pivotal movement of the platen support member of each back wing portion through at least about ninety degrees of pivotal movement between a first condition at which the platen support member of the back wing portion provides the substantially forwardly-facing surface of the back wing portion and a second condition at which the platen support member of the back wing portion provides the aforesaid partition provided by the back wing portion.

10. The seat as defined in claim 9 wherein the seat includes a frame having a frame portion associated with the back portion, and the platen support member of each back wing portion is hingedly joined to the frame portion of the frame associated with the back portion.

11. A seat having a seating region including a seat portion having two opposite sides and having a backing region including a back portion having two opposite sides and wherein the seat portion of the seat defines a substantially upwardly-facing surface and the back portion of the seat defines a substantially forwardly-facing surface, the seat comprising:

a pair of side wing portions wherein each side wing portion is connected to the seat portion adjacent a corresponding one of the two opposite sides of the seat portion of the seat and wherein each of the side wing portions includes a distensible envelope which can be altered in shape between a deflated condition at which the side wing portion contributes to the overall width of the seating region of the seat and an inflated condition at which the side wing portion reduces the overall width of the seating region of the seat and provides a partition adjacent the corresponding side of the two opposite sides of the seat portion of the seat so that when the distensible envelopes of both side wing portions are in the inflated condition and the seat portion is in its condition of reduced width, the pair of partitions provided by the pair of side wing portions are arranged on opposite sides of the seating region and are capable of capturing an individual positioned between the pair of partitions of the side wing portions;

a pair of back wing portions wherein each back wing portion is connected to the back portion adjacent a corresponding one of the two opposite sides of the back portion of the seat and wherein each back wing portion includes a distensible envelope which can be altered in shape between a deflated condition at which the back wing portion contributes to the overall width of the backing region of the back portion of the seat and an inflated condition at which the back wing portion reduces the overall width of the backing region of the back portion and provides a partition adjacent the corresponding side of the two opposite sides of the back portion of the seat so that when the distensible envelopes of both back wing portions are in the inflated condition and the back portion is in its condition of reduced width, the partitions provided by both of the back wing portions are arranged on opposite sides of the back portion and are capable of capturing an individual arranged between the pair of partitions provided by the back wing portions; and means for selectively altering the condition of the distensible envelopes of the side wing portions and the back wing portions between the inflated and deflated conditions; and wherein each side wing portion includes a platen support member which, when the distensible envelope of the side wing portion is in the deflated condition, provides a substantially upwardly-facing surface disposed adjacent the substantially upwardly-facing surface of the seat portion of the seat and which, when the distensible envelope of the side wing Portion is in the inflated condition, provides the aforesaid partition provided by the side wing portion; and wherein each back wing portion includes a platen support member which, when the distensible envelope of the back wing portion is in the deflated condition, provides a substantially forwardly-facing surface disposed adjacent the substantially forwardly-facing surface of the back portion of the seat and which, when the distensible envelope of the back wing portion is in the inflated condition, provides the aforesaid partition provided by the back wing portion.

12. The seat as defined in claim 11 wherein the platen support member of each side wing portion is pivotally joined to the seat portion adjacent a corresponding one of the two opposite sides of the seat portion to accommodate a pivotal movement of the platen support member between a first condition at which the platen support member of each side wing portion provides the substantially upwardly-facing surface of the side wing portion disposed adjacent the upwardly-facing surface of the seat portion of the seat and a second condition at which the platen support member of each side wing portion provides the aforesaid partition provided by the side wing portion; and wherein the platen support member of each back wing portion is pivotally joined to the back portion adjacent a corresponding one of the two opposite sides of the back portion to accommodate a pivotal movement of the platen support member of each back wing portion between a first condition at which the platen support member of each back wing portion provides the substantially forwardly-facing surface of the back wing portion disposed adjacent the forwardly-facing surface of the back portion of the seat and a second condition at which the platen support member of each back wing portion provides the aforesaid partition provided by the back wing portion.

13. The seat as defined in claim 12 wherein the seat includes a frame having a first frame portion associated with the seat portion, and each platen support member is hingedly joined to the first frame portion; and wherein the frame of the seat includes a second frame portion associated with the back portion, and the platen support member associated with each back wing portion is hingedly joined to the second frame portion.

14. The seat as defined in claim 12 wherein the means for selectively inflating and deflating the distensible envelopes of the side wing portions and the back wing portions includes a source of pressurized gas.

15. The seat as defined in claim 14 further including a control arrangement with which pressurized gas from the source can be directed into the distensible envelopes for the purpose of inflating the distensible envelopes and with which pressurized gas can be released from the distensible envelopes for the purpose of deflating the distensible envelopes.

* * * * *